United States Patent
Hsieh et al.

(10) Patent No.: US 10,349,646 B2
(45) Date of Patent: Jul. 16, 2019

(54) FLOAT WITH FISHING CONDITIONS DETECTION

(71) Applicant: Intel Corporation, Santa Clara, CA (US)

(72) Inventors: Yin Hui Hsieh, Taipei (TW); Ta Wei Chung, Taipei (TW); Cheng Ying Weng, Taipei (TW)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 15/253,776

(22) Filed: Aug. 31, 2016

(65) Prior Publication Data
US 2018/0055028 A1   Mar. 1, 2018

(51) Int. Cl.
*A01K 93/02* (2006.01)
*G01K 13/02* (2006.01)
*G01P 1/02* (2006.01)
*G01P 13/00* (2006.01)
*G01K 13/00* (2006.01)

(52) U.S. Cl.
CPC .............. *A01K 93/02* (2013.01); *G01K 13/00* (2013.01); *G01K 13/02* (2013.01); *G01P 1/023* (2013.01); *G01P 13/0006* (2013.01); *G01K 2013/026* (2013.01)

(58) Field of Classification Search
CPC .. A01K 93/02; G01K 13/02; G01K 2013/026; G01P 13/0006; G01P 1/023
See application file for complete search history.

(56) References Cited

U.S. PATENT DOCUMENTS

| | | | | |
|---|---|---|---|---|
| 7,131,231 B1* | 11/2006 | Lee | ................. | A01K 93/02 43/17 |
| 7,562,488 B1* | 7/2009 | Perkins | ................. | A01K 87/007 43/17 |
| 9,383,444 B2* | 7/2016 | Lebedev | ................. | G01S 7/003 |
| 9,574,930 B2* | 2/2017 | Lin | ................. | G01F 23/68 |

OTHER PUBLICATIONS

Zheng, Y., et al., "Physical Activity Recognition from Accelerometer Data Using a Multi-Scale Ensemble Method," Proceedings of the Twenty-Fifth Innovative Applications of Artificial Intelligence Conference, Association for the Advancement of Artificial Intelligence (www.aaai.org).

(Continued)

*Primary Examiner* — Elias Desta
(74) *Attorney, Agent, or Firm* — Schwabe, Williamson & Wyatt, P.C.

(57) ABSTRACT

Embodiments of the present disclosure provide for an apparatus for a float with fishing conditions detection capabilities. In one instance, the float may include a float case, one or more sensors disposed inside the float case, and a processing block coupled with the sensors and disposed inside or outside the float case. The processing block may be configured to detect one or more conditions of fishing. To detect the conditions of fishing, the processing block may be configured to receive and process sensor readings from the sensors, and determine the conditions of fishing, based on a result of the processing of the sensor readings. Other embodiments may be described and/or claimed.

18 Claims, 7 Drawing Sheets

(56) References Cited

OTHER PUBLICATIONS

Raymarine Dragonfly 5PRO Review, <<http://fishfinderplanet.com/raymarine-dragonfly-5pro-review/>> [last visited Aug. 31, 2016 2:48:12 PM] 7 pages.
Fishing Information | Ideal Temperatures for Freshwater Fish, <<http://www.fishing.info/water_temp.html,>> [last visited Aug. 31, 2016 3:14:43 PM] 2 pages.
SensorEvent | Android Developers, <<https://developer.android.com/reference/android/hardware/SensorEvent.html,>> [last visited Aug. 31, 2016] 14 pages.
Beaufort scale—Wikipedia, <<https://en.wikipedia.org/wiki/Beaufort_scale>> [last visited Aug. 31, 2016] 10 pages.

\* cited by examiner

FLOAT WITH FISHING CONDITIONS DETECTION

FIELD

Embodiments of the present disclosure generally relate to the field of sensor devices, and more particularly, to a float with sensors to detect fishing conditions.

BACKGROUND

A float is an item of angling equipment that may be attached to a fishing line, and may serve several purposes. A float may suspend the bait at a predetermined depth. Due to its buoyancy, a float may carry the baited hook to otherwise inaccessible areas of water by allowing drifting in the prevailing current. Furthermore, a float may serve as a visual bite indicator. However, when fishing in rough water conditions, a float may not always be visible in the waves. Furthermore, it may be difficult for a fisherman to determine whether a fish bit the hook when watching the float motioning in the waves, particularly in some distance away from the fisherman.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for a float with fishing conditions detection capabilities. In accordance with embodiments, the float may include a float case, one or more sensors disposed inside the float case, and a processing block coupled with the sensors and disposed inside or outside the float case. The processing block may be configured to detect one or more conditions of fishing. To detect the conditions of fishing, the processing block may be configured to receive and process sensor readings from the sensors, and determine the conditions of fishing, based on a result of the processing of the sensor readings.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
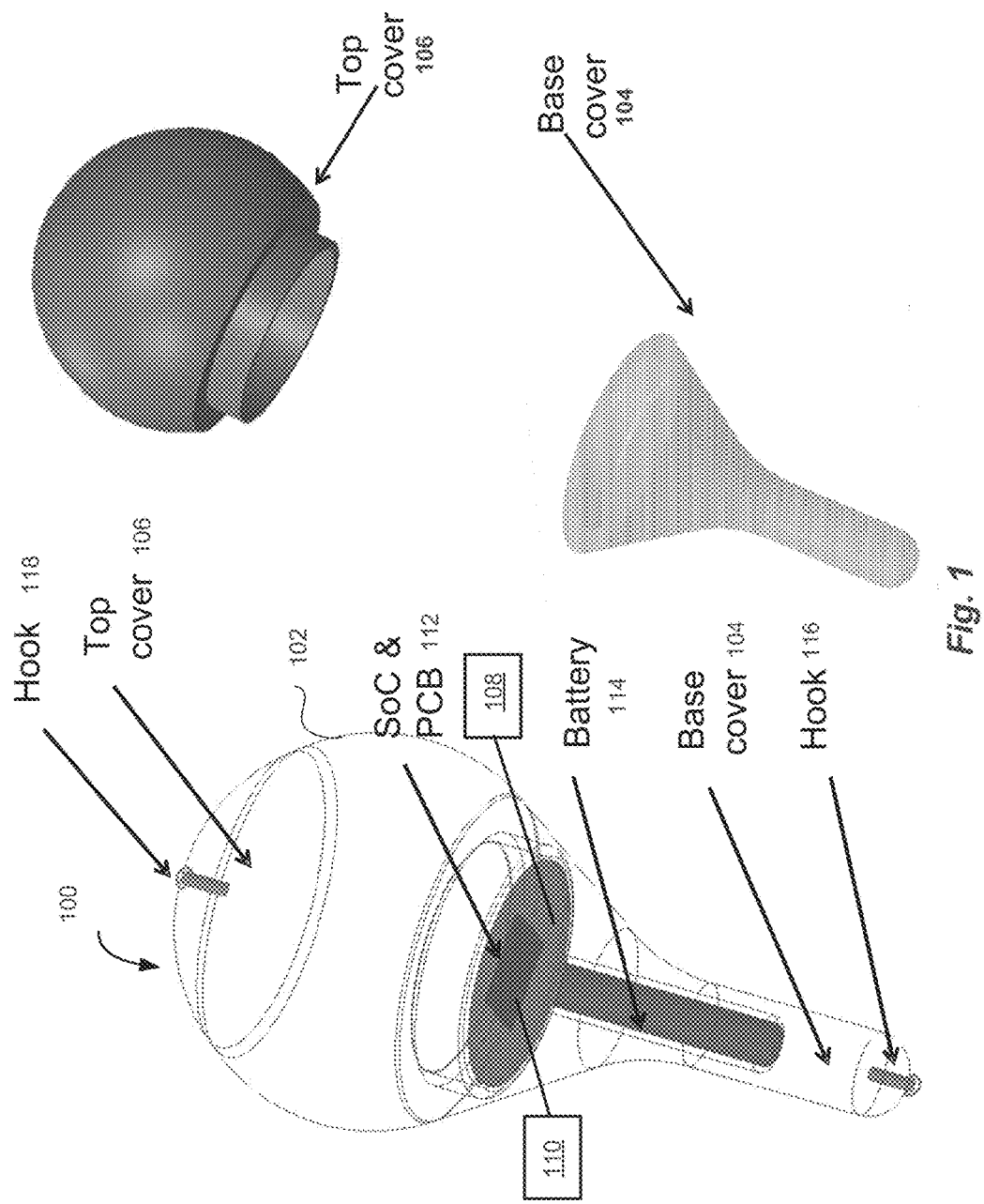
FIG. 1 illustrates an example float with fishing conditions detection capabilities, incorporated with the teachings of the present disclosure, in accordance with some embodiments.

FIG. 1 illustrates an example float with fishing conditions detection capabilities, incorporated with the teachings of the present disclosure, in accordance with some embodiments. In embodiments, the float 100 may take different shapes, forms, and sizes, depending on targeted fish and/or fishing conditions, in addition or as an alternative to the shape illustrated in FIG. 1. Accordingly, the shape, size, and form of the float 100 are illustrated in FIG. 1 for purposes of understanding and are not limited to this disclosure.

In embodiments, the float 100 may include a float case 102, which may form an enclosed shell, as shown. For example, the float case 102 may include a base 104 and a top 106 disposed on the base 104 to form an enclosed shell. It is understood that at least the base 104 of the float 102 may be submerged in water during fishing.

The float 100 may include one or more sensors 108 disposed inside the case 102 to detect some parameters of fishing conditions. The sensors 108 may include, for example, one or more of: a motion sensor (e.g., accelerometer) to detect a motion of the float 100 relative to a horizon, a temperature sensor to detect surrounding water temperature, a passive infrared (PIR) sensor to detect a proximity of fish to the float 100 (and to a corresponding hook), and a light emitting diode (LED) sensor to provide for increased visibility of the float 100 (e.g., at night time) and/or indicate a battery life as discussed below. Other sensors that may serve to detect different fishing conditions may be included in the float 100.

The float 100 may further include a processing block 110 coupled with the sensors 108 and disposed inside the float case 102 to detect conditions of fishing with the float. The processing block 110 may be configured to receive and process sensor readings from the sensors 108, and determine the fishing conditions based on a result of the processing of the sensor readings. In some embodiments, the processing block 110 may be disposed outside the float 100, e.g., at an external computing device (not shown), and the readings of the sensors 108 may be provided to the external device for processing.

In embodiments, the processing block 110 may be integrated in a System-on-a-Chip (SoC) configuration and reside on a printed circuit board (PCB) 112. In some embodiments, the processing block 110 may reside on a flexible printed circuit (FPC). For ease of understanding, PCB will be used hereinafter to encompass PCB and FPC embodiments. The float 100 may further include a battery 114 to power the PCB 112. As shown, the battery 114 may be disposed inside the base 104, to ensure stability of the float 110 in the water and mitigate wave impact on the sensor readings. In some embodiments, the LED sensor may be disposed in the float 100, and may be configured to show a level of charge of a battery 114.

The sensors 108 may be disposed in various locations inside the float case 102. For example, an accelerometer may be disposed in the PCB 112 or externally to the PCB 112, for example, in an area covered by the base 104, to ensure that the top 106 may be replaceable, so that the float 100 may meet particular buoyancy requirements. A temperature sensor may be placed in the area covered by the base 104, in order to ensure correct temperature reading of the surrounding water when the float 100 may be at least partially submerged into the water (e.g., at least a part of the base 104 may be in the water), and to mitigate or prevent pre-heating of the temperature sensor.

Figure 2:
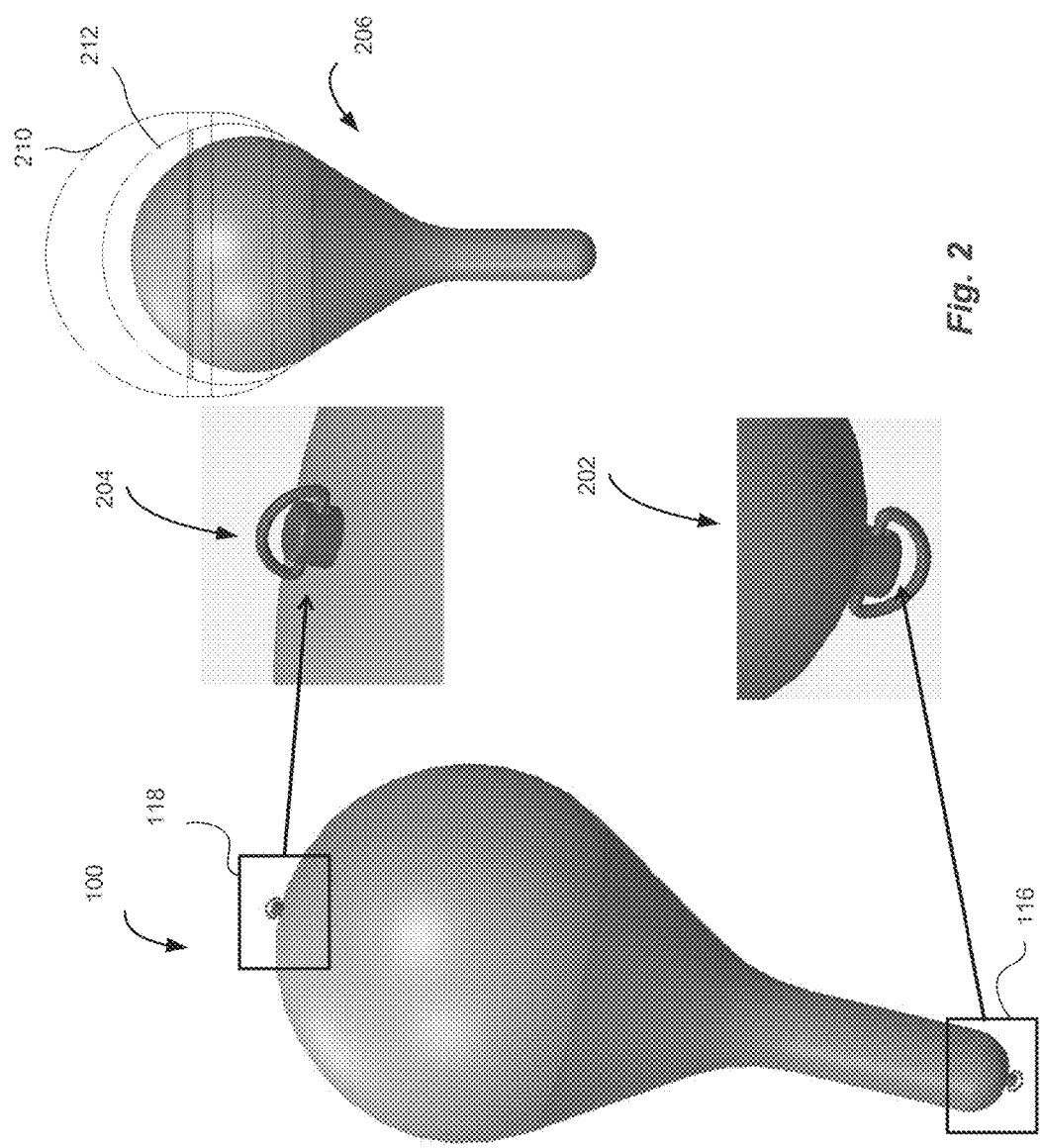
FIG. 2 illustrates some aspects of the float with fishing conditions detection of FIG. 1, in accordance with some embodiments.

FIG. 2 illustrates some aspects of the float with fishing conditions detection of FIG. 1, in accordance with some embodiments. The float 100 may further include one or more hooks 116, 118 (also shown in FIG. 1) disposed on the float case 102, in order to connect the float 100 with a fishing line (not shown). Some aspects of example structural attachment of the hooks 116, 118 to the float case 102 are illustrated in blown-out views 202 and 204 of FIG. 2. As shown, the hooks 116, 118 may take a ring-like shape, to ensure connection of the base 104 and top 106 with the fishing line.

Further, as view 206 indicates, a size and shape of the replaceable top 106 may vary (e.g., 210, 212), to meet specific buoyancy requirements for the float 100.

Figure 3:
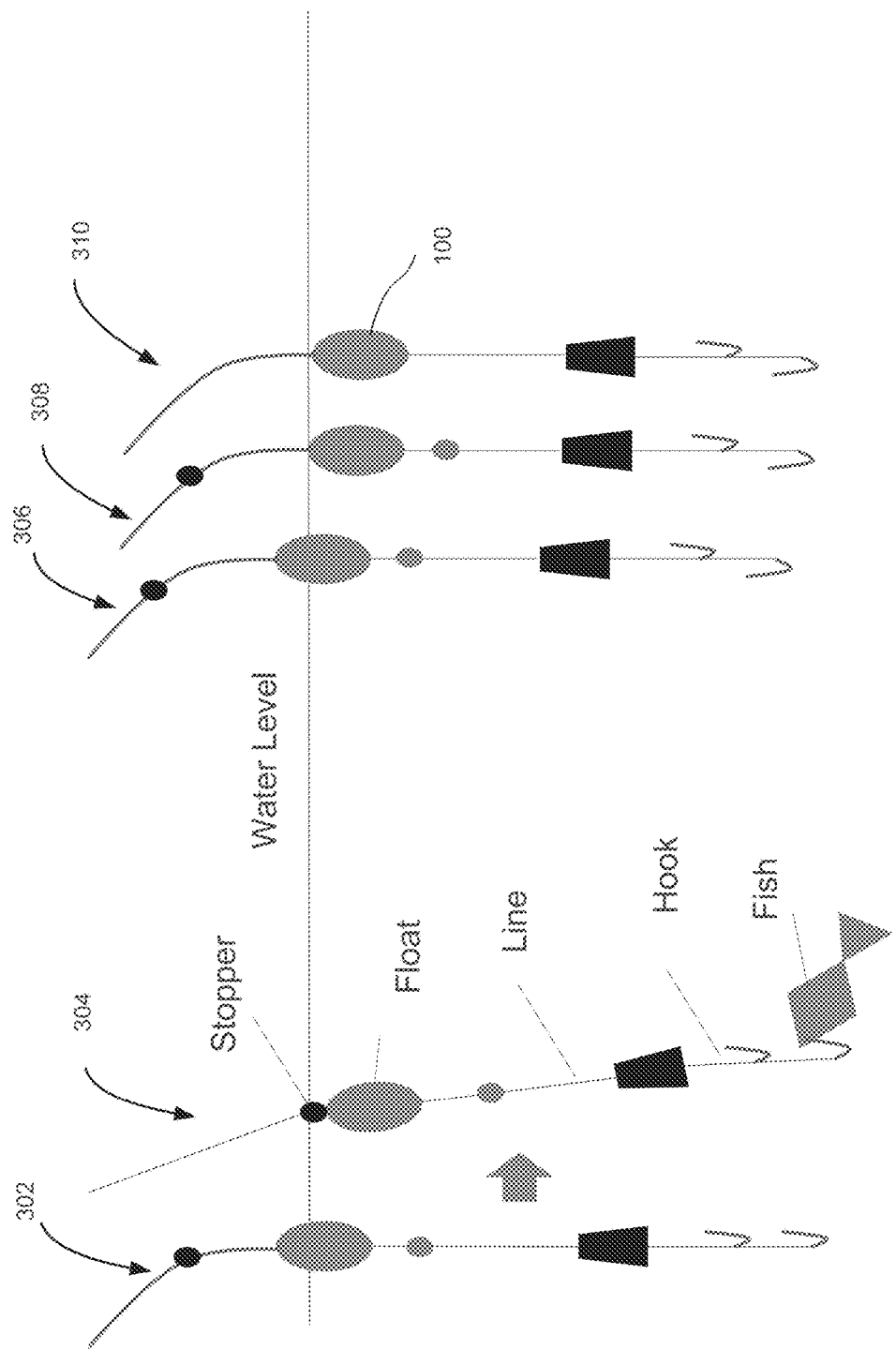
FIG. 3 illustrates some aspects of using the float with fishing conditions detection, in accordance with some embodiments.

FIG. 3 illustrates some aspects of using the float 100 with fishing conditions detection, in accordance with some embodiments. A conventional fishing arrangement may include a line, a stopper attached to the line, a conventional float attached to the line at some distance below the float, and hook, as shown in views 302 and 304 of FIG. 3. When a fish bites a hook attached to a conventional float with a line, it may apply a downward force to the hook. Accordingly, as shown in view 304, the float may submerge in the water and the line may straighten until the float reaches the stopper, to prevent the float from full submersion and thus becoming invisible. However, as it sometimes happens, the fish may just peck the bait off the hook and leave.

View 306 shows an example in which a conventional float may be submerged in the water partially (e.g., about 50% or more below the water level). In this example, the fish may need more power to push the line down and to make the float motions visible to a user, while the float remains at least partially visible.

View 308 shows an example in which a conventional float may be substantially fully submerged in the water. In this example, the fish may need to apply less effort to make the float move because the whole float is underwater, and thus may have less resistance to motion in the water. However, the conventional float, fully submerged, may not be visible to the user, particularly at some distance from the shore, which may be detrimental to successful fishing. Accordingly, the conventional float motion due to fish biting may not be detectable, even though the float may be more susceptible to motion in response to fish biting when fully submerged.

View 310 illustrates an example in which a float with fishing conditions detection (e.g., float 100) may be used. Because the motion of the float may be detected using a built-in sensor (accelerometer), the float may be fully submerged, and relatively small motions of the float due to fish biting may be detected by the float and corresponding alerts may be provided to the user. Furthermore, a stopper may not be needed because the float may be fully submerged, to ensure sensitivity to fish biting that may be detectable by the accelerometer, while visibility of the float may no longer be critical, compared to conventional solutions discussed above. The weight of the float may be selected in order to provide a desired full or partial submerging of the float in surrounding water, to mitigate potential wave impact on the sensor readings.

Figure 4:
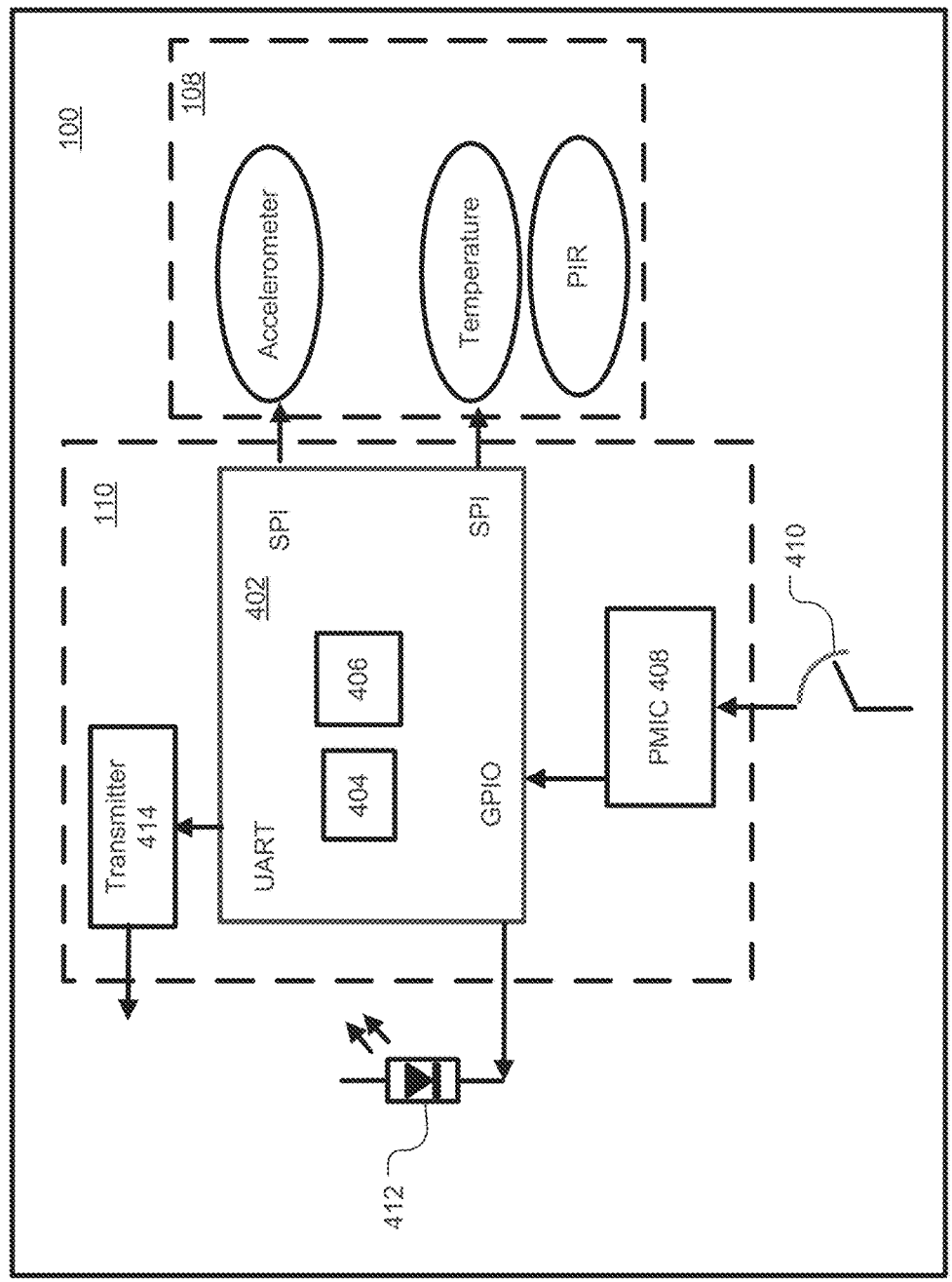
FIG. 4 is an example block diagram illustrating some components of the float with fishing conditions detection of FIG. 1, in accordance with some embodiments.

FIG. 4 is an example block diagram illustrating some components of the float with fishing conditions detection of FIG. 1, in accordance with some embodiments. More specifically, FIG. 4 illustrates some components of the circuitry of the float 100 that may be disposed on and/or coupled with the PCB 112, as shown.

The processing block 110 of the float 100 may include a controller 402 with a processor 404 and memory 406. The processor 402 may include, for example, one or more processors situated in separate components, or alternatively one or more processing cores embodied in a component (e.g., in an SoC configuration), and any processor-related support circuitry (e.g., bridging interfaces, etc.). Example processors may include, but are not limited to, various microprocessors including those in the Pentium®, Xeon®, Itanium®, Celeron®, Atom®, Quark®, Core® product families, or the like. Examples of support circuitry may include host side or input/output (I/O) side chipsets (also known as northbridge and southbridge chipsets/components) to provide an interface through which the processor 402 may interact with other system components that may be operating at different speeds, on different buses, etc. in apparatus 100. Some or all of the functionality commonly associated with the support circuitry may also be included in the same physical package as the processor.

The memory 406 may comprise random access memory (RAM) or read-only memory (ROM) in a fixed or removable format. RAM may include volatile memory configured to hold information during the operation of apparatus 100 such as, for example, static RAM (SRAM) or dynamic RAM (DRAM). ROM may include non-volatile (NV) memory circuitry configured based on basic input/output system (BIOS), Unified Extensible Firmware Interface (UEFI), etc. to provide instructions when controller 402 is activated, programmable memories such as electronic programmable ROMs (erasable programmable read-only memory), Flash, etc.

The processing block 110 may further include components configured to record and process the readings of the sensors 108. The processing block 110 may provide these components through, for example, a plurality of processor-readable instructions stored in the memory 406 and executable on the processor 404 of the controller 402.

The controller 402 may be coupled (e.g., via respective serial peripheral interfaces (SPI)) with one or more sensors 108, such as accelerometer, temperature sensor, PIR sensor, and/or other sensors as needed. The controller 402 may be further coupled (e.g., via general purpose input-output ports (GPIO)) with a power management integrated circuit (PMIC) 408. The PMIC 408 may be configured to manage power provided by the battery 114 (shown in FIG. 1). The float 100 may be equipped with a power switch 410, to power on and off the processing block 110. The PMIC may be coupled with a power indicator (e.g., LED) 412, to indicate to the user that the batter power is below a threshold level.

The controller 402 may be further coupled (e.g., via universal asynchronous receiver transmitter (UART) to the transmitter block 414, configured to transmit the results of processing the readings provided by the sensors 108 to an external device (not shown), e.g., a smartphone or other computing device accessible by the user. The results may be transmitted via a wireless network, such as any type of near-field communication network (NFC), Wi-Fi, Bluetooth®, wireless local area network (WLAN), communications access for land mobiles (CALM) or the like. In some embodiments, the results may be transmitted via a wired network, e.g., provided or facilitated by the fishing line with which the float 100 may be connected.

In some embodiments, the controller 402 (or its processing components 404, 406) may be disposed on an external device (not shown), such as the user's smartphone, for example. In these embodiments, the sensors 108 readings may be transmitted to the external device by the transmitter block 414 for processing. For example, the external device may be configured to process the sensors readings (e.g., temperature and accelerometer data) as described below in reference to FIG. 5. In another example, the external device may be configured to provide the sensor readings to cloud computing for further processing.

The processing block 110 may include other components necessary for functioning of the float 100, some of which are not described herein for ease of understanding. Other components may include, for example, one or more interfaces (not shown) to communicate the detected fishing conditions over one or more wired or wireless network(s) and/or with any other suitable device, such as external computing device (not shown).

The processing block 110 may further include circuitry configured to facilitate a provision of readings from different sensors embedded in or otherwise coupled with the apparatus 100. Such circuitry (not shown) may include, for example, an amplifier, an analog-to-digital converter (ADC) and a controller to operate the circuitry. In some embodiments, the circuitry may be integrated in a form of an integrated circuit (IC).

Figure 5:
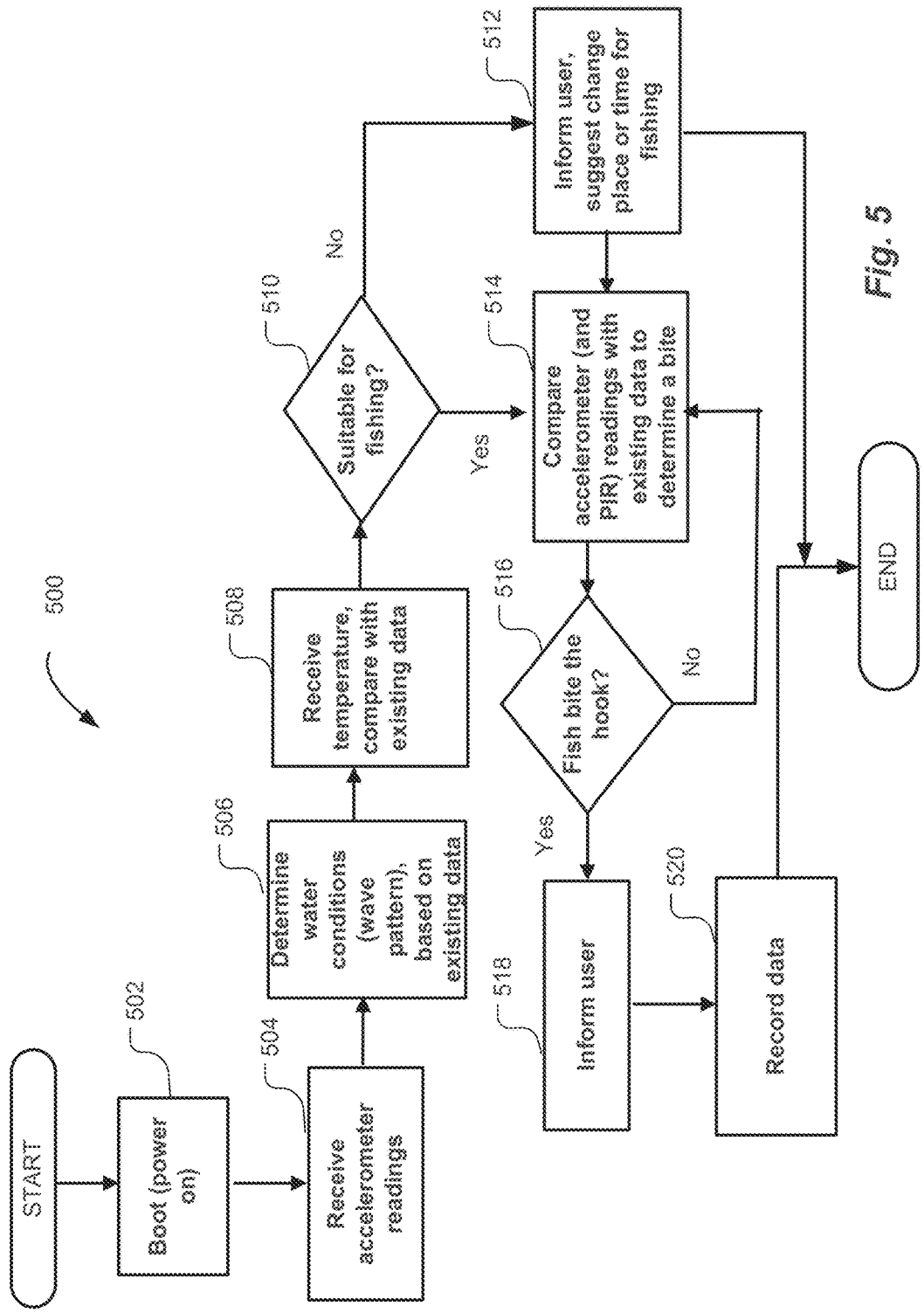
FIG. 5 is a process flow diagram for determining fishing conditions using the float with fishing conditions detection, in accordance with some embodiments.

FIG. 5 is a process flow diagram for determining fishing conditions using the float with fishing conditions detection, in accordance with some embodiments. The process 500 may comport with and be performed by some of the elements of the various embodiments earlier described in reference to FIGS. 1-4. In alternate embodiments, the process 500 may be practiced with more or fewer operations, or a different order of the operations. For example, the actions of blocks 504-508 may be performed substantially simultaneously or in a different order. The process 500 may be performed, for example, by the processing block 110 of the float 100 of FIG. 1.

The process 500 may begin at block 502 and include initializing the processing block 110 of the float 100, e.g., by powering on (booting) the processing block 110. As discussed in reference to FIG. 4, power may be supplied to the processing block 110 by enabling the switch 410, to connect the battery (not shown) with the processing block 110.

At block 504, the process 500 may include receiving readings from an accelerometer disposed inside the float 100.

At block 506, the process 500 may include determining water conditions (e.g., wave pattern). The determination may be performed, for example, by comparing accelerometer readings with existing (historic) data indicating wave patterns that may be stored in memory 406 and be accessible by the processor 404. Sea waves represent harmonic waves with different wave patterns, and corresponding data indicating such patterns may be stored for comparison with accelerometer readings and making appropriate determinations regarding the wave pattern.

At block 508, the process 500 may include receiving temperature from a temperature sensor disposed inside the float 100, and comparing the temperature with existing (historic) data, to further determine water conditions with respect to suitability for fishing. Temperature ranges suitable for different types of fish may be available and stored for such comparison. For example, if the water temperature is below a predetermined threshold, it may be determined that the water is not suitable for fishing (e.g., for particular fish species) at this time.

At decision block 510, the process 500 may include determining whether water conditions are suitable for fishing, based at least in part on the readings provided by the accelerometer and temperature sensors as described above. If it is determined that the water conditions are not suitable for fishing, the process 500 may move to block 512, at which a message may be sent to a user device to inform the user about the water suitability for fishing. The message may further include suggestions regarding a change of a place or time for fishing in the water. In alternate embodiments, the user may be informed via other audio/visual manners, e.g., the sounding of a beeper, or lighting of a visual indicator.

If it is determined that the water conditions are suitable for fishing, the process 500 may move to block 514, at which accelerometer readings may be compared with existing data to determine whether a fish is biting the hook. The accelerometer readings related to fish bites may be distinguished from the readings related to wave pattern detection, for example, by a signal (g) rise time or by using Fast Fourier transform (FFT). Further, machine learning algorithms may be used to train data for accelerometer-based fish detection, using signal rise time as a parameter, based, for example, on Hidden Markov Model or support vector machine (SVM) method.

Figure 6:
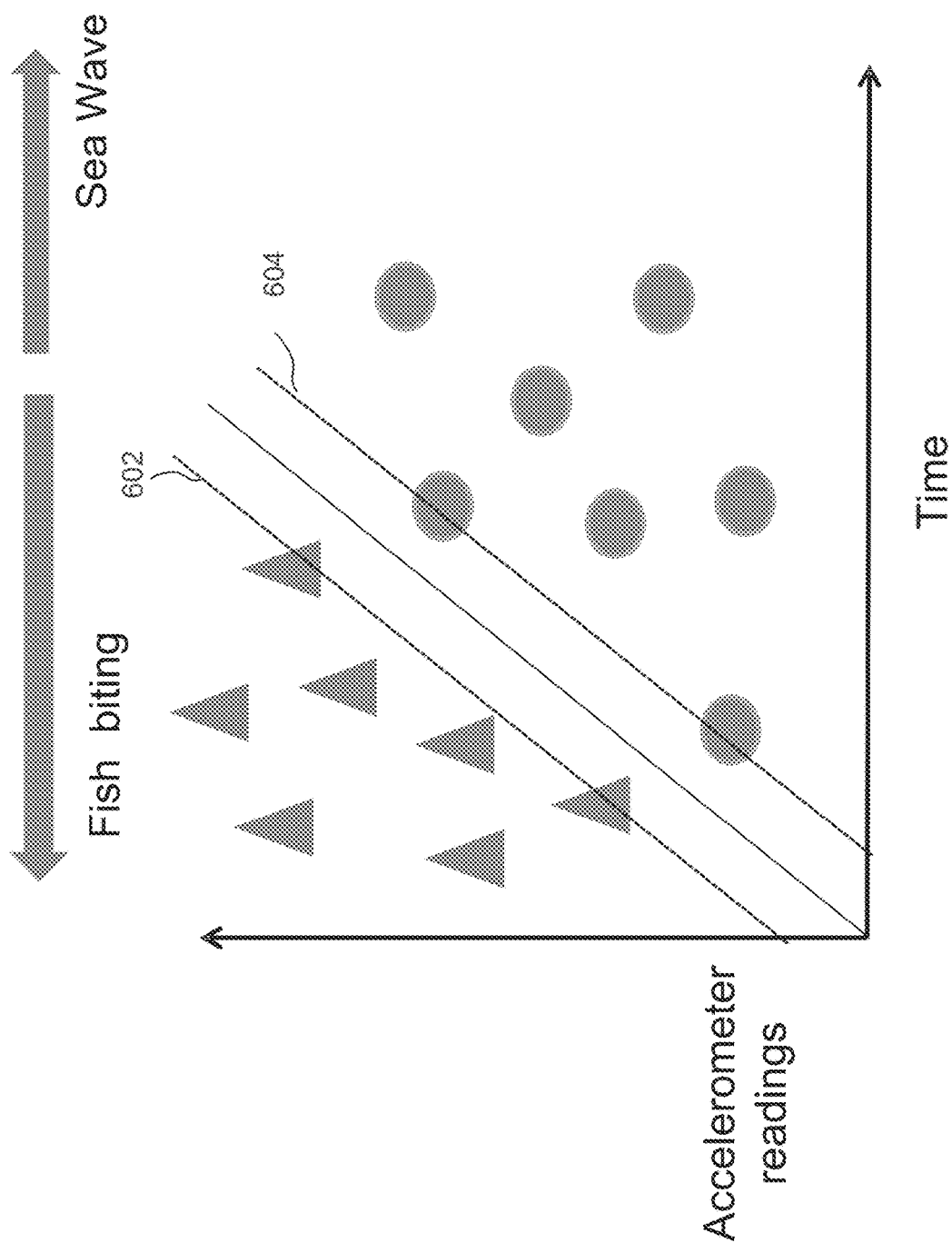
FIG. 6 is an example graph illustrating accelerometer readings as a function of time for an accelerometer that may be disposed in a float with fishing conditions detection, in accordance with some embodiments.

FIG. 6 is an example graph illustrating accelerometer readings as a function of time for an accelerometer that may be disposed in a float with fishing conditions detection, in accordance with some embodiments. It may be shown experimentally that the readings above the line 602 of the graph may indicate fish biting, while the readings below the line 604 of the graph may indicate wave patterns (e.g., harmonic sea waves). Accordingly, the readings of the accelerometer pertaining to wave patterns may be distinguished from the readings pertaining to fish biting with a desired level or granularity.

Referring again to FIG. 5, in some embodiments, a PIR sensor may be disposed inside the float 100. Accordingly, at block 514, in addition or in the alternative to the actions describe above, PIR sensor readings may be analyzed to detect proximity of fish to the float 100 and to the hook. Fish is a cold-blooded animal, and its proximity may be detectable by the PIR sensor based on its expected body temperature range.

At decision block 516 it may be determined, from analysis of accelerometer and/or PIR sensor readings, whether a fish bit the hook. If no bite is determined, the process 500 may return to block 514. If a bite is determined, the process 500 may move to block 518, at which a message may be sent to a user device to inform the user. For example, it may be determined, based on the readings of the accelerometer and/or PIR sensor, that the fish is likely biting the hook entirely. An alert may be issued for the user to wind up the fishing line.

In another example, it may be determined that the fish is pecking the hook. An alert may be issued that the user may wait before winding up until the fish bites more, and then inform the user to wind up to see if the fish is on the hook.

In another example, it may be determined that the fish pecked a bit, but ended up not biting the hook then left. An alert may be issued that the user may wind up the fishing line to check and re-load bait if necessary.

At block 520, the sensor readings may be recorded as historic data for future reference and comparison.

As briefly discussed above, the float motions resulting from fish biting the hook may be detected while the float may be partially or fully submerged in the water. Accordingly, float motion detection may not depend on the float's visibility, at least directly.

In alternate embodiments, some of the operations may be divided, combined or performed in different order; e.g., but not limited to, temperature data may be received at substantially the same time as accelerometer readings are received, prior to determination of water conditions.

Figure 7:
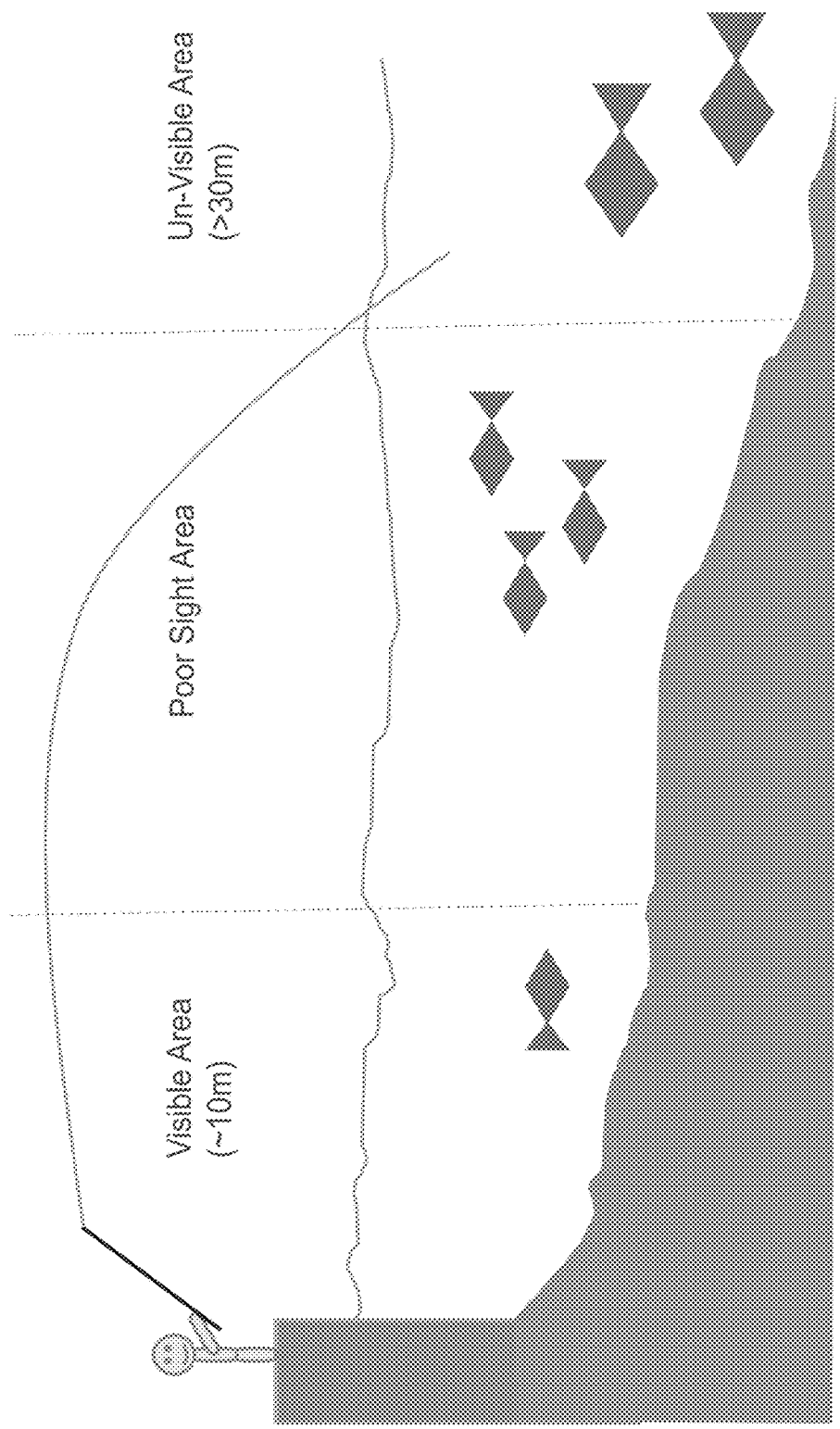
FIG. 7 is a schematic diagram illustrating an example range of using the float with fishing conditions detection, in accordance with some embodiments.

FIG. 7 is a schematic diagram illustrating an example range of using the float with fishing conditions detection, in accordance with some embodiments. As shown, the user may use the float with fishing conditions detection to catch fish in an area where the float may be visible (e.g., up to 10 meters), in a poor visibility area (e.g., from 10 to 30 meters), or in an area where the float may not be visible at all (e.g., over 30 meters). For example, a user may use a drone to send a fishing line with the float and hook out into open water, e.g., up to 1-1.5 kilometers or farther, subject to transmitter and battery power, and the fishing with the float according to described embodiments may still be possible.

The embodiments described herein may be further illustrated by the following examples.

Example 1 may be a float with fishing conditions detection, comprising: a float case; one or more sensors disposed inside the float case; and a processing block coupled with the one or more sensors and disposed inside or outside the float case to detect one or more conditions of fishing, wherein to detect one or more conditions of fishing, the processing block is to receive and process sensor readings from the one or more sensors, and determine the one or more conditions of fishing, based on a result of the processing of the sensor readings.

Example 2 may include the subject matter of Example 1, wherein the float case includes a base and a top disposed on the base to form an enclosed shell, wherein at least the base of the float is to be submerged in water during fishing, wherein the processing block is further disposed inside the base, to provide a desired stability level for the float.

Example 3 may include the subject matter of Example 2, wherein the float further includes a battery disposed inside the base and coupled with the processing block, to power the processing block.

Example 4 may include the subject matter of Example 3, wherein the float further includes a port coupled with the battery, to provide a charging of the battery.

Example 5 may include the subject matter of Example 1, wherein the processing block is integrated on a system on chip (SOC) disposed in a printed circuit board (PCB) or a flexible printed circuit (FPC).

Example 6 may include the subject matter of Example 1, wherein the one or more sensors include an accelerometer, and wherein the processing block is to determine the one or more fishing conditions based at least in part on sensor data output by the accelerometer.

Example 7 may include the subject matter of Example 6, wherein the one or more sensors further include at least one of: a temperature sensor, a passive infrared (PIR) sensor, and a light emitting diode (LED) sensor, and wherein the processing block is to determine the one or more fishing conditions based at least in part on sensor data output by the temperature sensor, the PIR sensor or the LED sensor.

Example 8 may include the subject matter of Example 7, wherein the float case includes a base and a top disposed on the base to form an enclosed shell, wherein the temperature sensor is disposed inside the base, to mitigate or prevent pre-heating of the temperature sensor.

Example 9 may include the subject matter of Example 1, wherein the float has a weight to provide full or partial submerging of the float in surrounding water, to mitigate wave impact on the sensor readings.

Example 10 may include the subject matter of Example 9, wherein the float is to be disposed in the surrounding water to provide a desired distance between a user and the float, independent of visibility of the float in the surrounding water, wherein the desired distance exceeds 10 meters.

Example 11 may include the subject matter of Example 1, wherein the one or more sensors include an accelerometer, wherein the processing block to determine one or more fishing conditions includes to identify a wave pattern of surrounding water based at least in part on readings provided by the accelerometer, to determine whether the water is suitable for fishing.

Example 12 may include the subject matter of Example 1, wherein the one or more sensors include a temperature sensor, wherein the processing block is further to determine whether a water temperature is within a range that is suitable for fishing, based at least in part on readings provided by the temperature sensor.

Example 13 may include the subject matter of Example 1, wherein the one or more sensors include an accelerometer, wherein the processing block to determine one or more fishing conditions includes to determine whether fish is biting a hook attached to the float, based at least in part on readings provided by the accelerometer.

Example 14 may include the subject matter of Example 1, wherein the processing block is to determine one or more fishing conditions based on a result of comparison of the sensor readings of a plurality of metrics with historic data of the metrics that is indicative of the fishing conditions and that is accessible by the processing block.

Example 15 may include the subject matter of any Examples 1 to 14, wherein the processing block is to further transmit the determined fishing conditions to an external device.

Example 16 may be a method for providing a float with fishing conditions detection, comprising: providing a case of the float; disposing one or more sensors inside the case of the float; disposing a processing block inside the case of the float, to receive and process sensor readings from the one or more sensors; and forming a communication path between the one or more sensors and the processing block, to provide for receiving sensor readings by the processing block, wherein the float is to detect one or more fishing conditions during fishing based on a result of the processing of the sensor readings by the processing block.

Example 17 may include the subject matter of Example 16, wherein providing a case includes: providing a base of the case; and providing a top of the case disposable on the base to form an enclosed shell.

Example 18 may include the subject matter of Example 17, wherein disposing a processing block inside the case of the float includes placing the processing block inside the base to provide a desired stability level for the float.

Example 19 may include the subject matter of Example 16, further comprising: disposing a battery inside the case; and forming a communication path between the processing block and the battery, to provide battery power to the processing block.

Example 20 may include the subject matter of any Examples 16 to 19, further comprising: selecting a weight of the float, to provide full or partial submerging of the float in surrounding water, to mitigate wave impact on the sensor readings.

Example 21 may be one or more non-transitory computing device-readable media having executable instructions for detection of fishing conditions stored thereon that, in response to execution, cause a computing device disposed in a float, to: receive and process sensor readings from one or more sensors disposed in the float and communicatively coupled with the computing device; and determine one or more conditions of fishing with the float, based on a result of the processing of the sensor readings.

Example 22 may include the subject matter of Example 21, wherein the one or more sensors include an accelerometer, wherein the instructions that cause the computing device to determine one or more fishing conditions further cause the computing device to identify a wave pattern of water surrounding the float based at least in part on readings provided by the accelerometer, to determine whether the water is suitable for fishing.

Example 23 may include the subject matter of Example 22, wherein the instructions that cause the computing device to determine one or more fishing conditions further cause the computing device to determine whether fish is biting a hook attached to the float, based at least in part on readings provided by the accelerometer.

Example 24 may include the subject matter of Example 21, wherein the one or more sensors include a temperature sensor, wherein the instructions that cause the computing device to determine one or more fishing conditions further cause the computing device to determine whether a water temperature is within a range that is suitable for fishing, based at least in part on readings provided by the temperature sensor.

Example 25 may include the subject matter of any Examples 21 to 24, wherein the instructions further cause the computing device to transmit the determined fishing conditions to an external device.

Example 26 may be a float for detection of fishing conditions comprising: means for receiving and processing sensor readings from one or more sensors disposed in the float; and means for determining one or more conditions of fishing with the float, based on a result of the processing of the sensor readings.

Example 27 may include the subject matter of Example 26, wherein the one or more sensors include an accelerometer, wherein the means for determining one or more fishing conditions include means for identifying a wave pattern of water surrounding the float based at least in part on readings provided by the accelerometer, to determine whether the water is suitable for fishing.

Example 28 may include the subject matter of Example 27, wherein the means for determining one or more fishing conditions further include means for determining whether fish is biting a hook attached to the float, based at least in part on readings provided by the accelerometer.

Example 29 may include the subject matter of Example 26, wherein the one or more sensors include a temperature sensor, wherein the means for determining one or more fishing conditions include means for to determining whether a water temperature is within a range that is suitable for fishing, based at least in part on readings provided by the temperature sensor.

Example 30 may include the subject matter of any Examples 26 to 29, wherein the float further comprises means for transmitting the determined fishing conditions to an external device.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A float with fishing conditions detection, comprising:
a float case;
one or more sensors disposed inside the float case, wherein the one or more sensors include a passive infrared (PIR) sensor, to detect proximity of fish to the float, based on expected fish body temperature range; and
a processing block coupled with the one or more sensors and disposed inside or outside the float case to detect one or more conditions of fishing, wherein to detect one or more conditions of fishing, the processing block is to receive and process sensor readings from the one or more sensors, and determine the one or more conditions of fishing, based on a result of the processing of the sensor readings, wherein the float has a weight to provide full submerging of the float in surrounding water, to mitigate wave impact on the PIR sensor detection of the proximity of fish to the float.

2. The float of claim 1, wherein the float case includes a base and a top disposed on the base to form an enclosed shell, wherein the processing block is further disposed inside the base, to provide a desired stability level for the float.

3. The float of claim 2, wherein the float further includes a battery disposed inside the base and coupled with the processing block, to power the processing block.

4. The float of claim 3, wherein the float further includes a port coupled with the battery, to provide a charging of the battery.

5. The float of claim 1, wherein the processing block is integrated on a system on chip (SOC) disposed in a printed circuit board (PCB) or a flexible printed circuit (FPC).

6. The float of claim 1, wherein the one or more sensors include an accelerometer, and wherein the processing block is to determine the one or more fishing conditions based at least in part on sensor data output by the accelerometer.

7. The float of claim 6, wherein the one or more sensors further include at least one of: a temperature sensor, and a light emitting diode (LED) sensor, and wherein the processing block is to determine the one or more fishing conditions based at least in part on sensor data output by the temperature sensor, the PIR sensor or the LED sensor.

8. The float of claim 7, wherein the float case includes a base and a top disposed on the base to form an enclosed shell, wherein the temperature sensor is disposed inside the base.

9. The float of claim 1, wherein the float is to be disposed in the surrounding water to provide a desired distance between a user and the float, independent of visibility of the float in the surrounding water, wherein the desired distance exceeds 10 meters.

10. The float of claim 1, wherein the one or more sensors include an accelerometer, wherein the processing block to determine one or more fishing conditions includes to identify a wave pattern of surrounding water based at least in part on readings provided by the accelerometer, to determine whether the water is suitable for fishing.

11. The float of claim 1, wherein the one or more sensors include a temperature sensor, wherein the processing block is further to determine whether a water temperature is within a range that is suitable for fishing, based at least in part on readings provided by the temperature sensor.

12. The float of claim 1, wherein the one or more sensors include an accelerometer, wherein the processing block to determine one or more fishing conditions includes to determine whether a fish is biting a hook attached to the float, based at least in part on readings provided by the accelerometer.

13. The float of claim 1, wherein the processing block is to determine one or more fishing conditions based on a result of comparison of the sensor readings of a plurality of metrics with historic data of the metrics that is indicative of the fishing conditions and that is accessible by the processing block.

14. The float of claim 1, wherein the processing block is to further transmit the determined fishing conditions to an external device.

15. A method for providing a float with fishing conditions detection, comprising:
providing a case of the float;
disposing one or more sensors inside the case of the float, including disposing inside the case a passive infrared (PIR) sensor, to detect proximity of fish to the float, based on expected fish body temperature range;
disposing a processing block inside the case of the float, to receive and process sensor readings from the one or more sensors;
forming a communication path between the one or more sensors and the processing block, to provide for receiving sensor readings by the processing block, wherein the float is to detect one or more fishing conditions during fishing based on a result of the processing of the sensor readings by the processing block; and
selecting a weight of the float, to provide full submerging of the float in surrounding water, to mitigate wave impact on the PIR sensor detection of the proximity of fish to the float.

16. The method of claim 15, wherein providing a case includes:
providing a base of the case; and
providing a top of the case disposable on the base to form an enclosed shell.

17. The method of claim 16, wherein disposing a processing block inside the case of the float includes placing the processing block inside the base to provide a desired stability level for the float.

18. The method of claim 15, further comprising:
disposing a battery inside the case; and
forming a communication path between the processing block and the battery, to provide battery power to the processing block.

* * * * *